(12) United States Patent
Grigsby

(10) Patent No.: US 7,277,934 B2
(45) Date of Patent: Oct. 2, 2007

(54) SYSTEM AND METHOD FOR CONFIGURING A PLATFORM EVENT TRAP DESTINATION ADDRESS

(75) Inventor: Steven A. Grigsby, Austin, TX (US)

(73) Assignee: Dell Products L.P., Rock Round, TX (US)

( * ) Notice: Subject to any disclaimer, the term of this patent is extended or adjusted under 35 U.S.C. 154(b) by 771 days.

(21) Appl. No.: 10/136,092

(22) Filed: May 1, 2002

(65) Prior Publication Data

US 2003/0208577 A1   Nov. 6, 2003

(51) Int. Cl.
*G06F 15/173* (2006.01)
*G06F 15/16* (2006.01)

(52) U.S. Cl. .................. 709/223; 709/224; 709/245

(58) Field of Classification Search .............. 709/223, 709/224, 245
See application file for complete search history.

(56) References Cited

U.S. PATENT DOCUMENTS

| | | | | |
|---|---|---|---|---|
| 5,812,819 A * | 9/1998 | Rodwin et al. | ................ | 703/23 |
| 5,918,016 A | 6/1999 | Brewer et al. | ............ | 395/200.5 |
| 5,970,149 A | 10/1999 | Johnson | ........................ | 380/49 |
| 5,984,178 A * | 11/1999 | Gill et al. | .................... | 235/379 |
| 6,029,196 A | 2/2000 | Lenz | .......................... | 709/221 |
| 6,061,742 A * | 5/2000 | Stewart et al. | .............. | 709/250 |
| 6,065,136 A * | 5/2000 | Kuwabara | ..................... | 714/31 |
| 6,298,457 B1 * | 10/2001 | Rachlin et al. | ............... | 714/49 |
| 6,349,335 B1 * | 2/2002 | Jenney | ........................ | 709/224 |
| 6,363,421 B2 * | 3/2002 | Barker et al. | ................ | 709/223 |
| 6,477,667 B1 * | 11/2002 | Levi et al. | ..................... | 714/57 |
| 6,567,937 B1 * | 5/2003 | Flores et al. | .................. | 714/46 |
| 6,606,716 B1 * | 8/2003 | Vrhel et al. | ................... | 714/32 |
| 6,631,407 B1 * | 10/2003 | Mukaiyama et al. | ....... | 709/223 |
| 2001/0047471 A1 | 11/2001 | Johnson | | |

FOREIGN PATENT DOCUMENTS

WO   01/49003 A2   7/2001

OTHER PUBLICATIONS

Distributed Management Task Force, Inc.'s, "Alert Standard Format (ASF) Specification," Version 1.03, Jun. 20, 2001 (pp i-v, 2-79).

* cited by examiner

*Primary Examiner*—Ario Etienne
*Assistant Examiner*—Sargon N. Nano
(74) *Attorney, Agent, or Firm*—Baker Botts L.L.P.

(57) ABSTRACT

A system having a management console and one or more managed nodes is described. The management console has a network address and is connected to a network. Each managed node includes a network interface card for connecting with a network and an alert sending device for generating Alert Standards Forum Platform Event Traps in response to conditions at the managed node. The managed nodes are further able to receive Platform Event Trap destination address configuration packets and adopt the network address of the management consoles as the Platform Event Trap destination address.

18 Claims, 4 Drawing Sheets

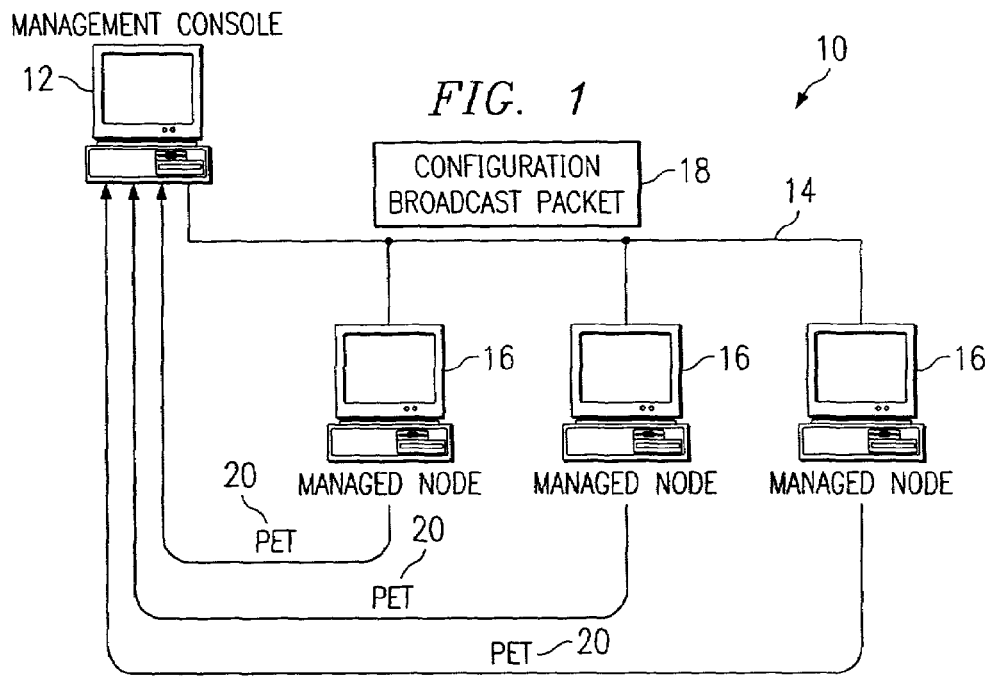
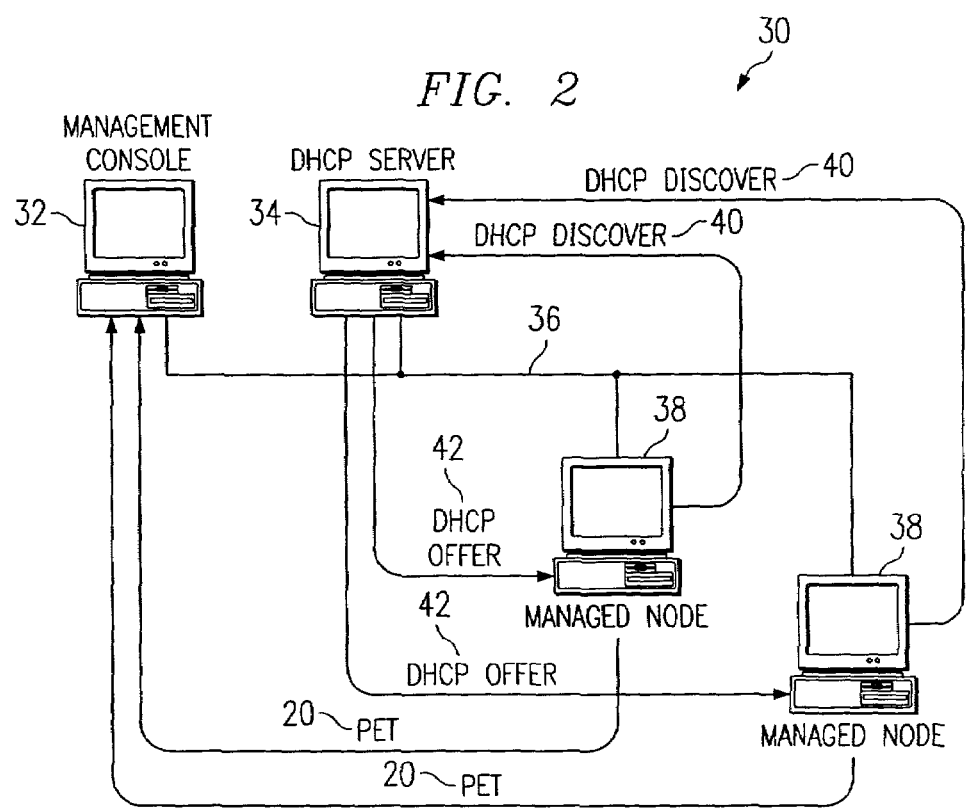

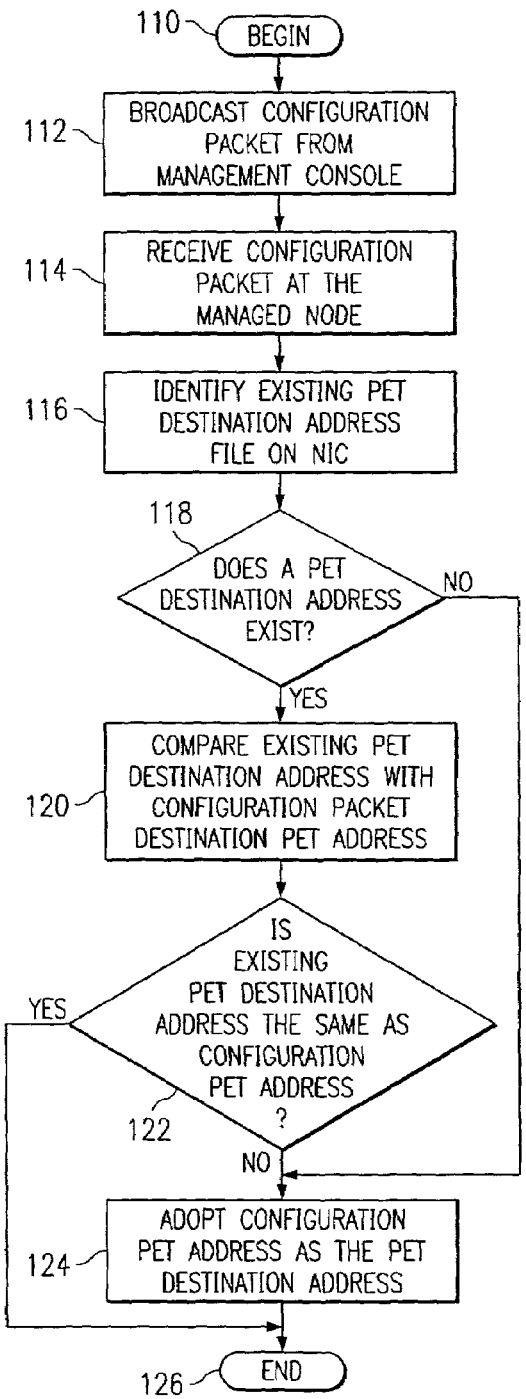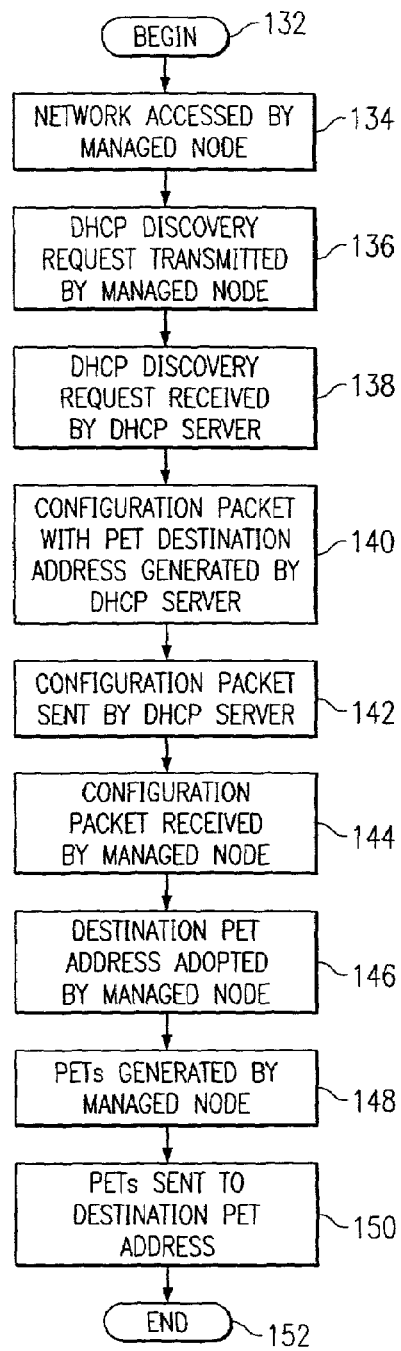

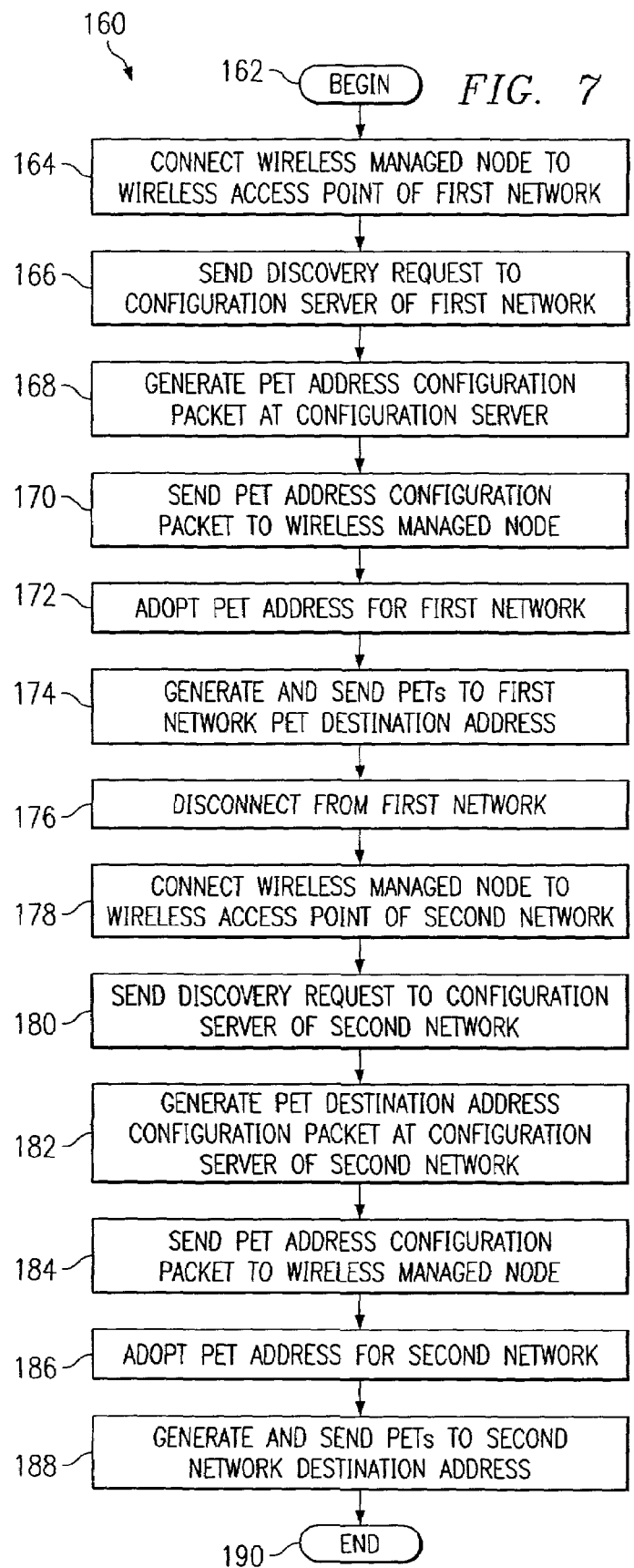

SYSTEM AND METHOD FOR CONFIGURING A PLATFORM EVENT TRAP DESTINATION ADDRESS

TECHNICAL FIELD

The present disclosure related in general to the field of electronic devices and more particularly to a system and method for automatically configuring a platform event trap destination address.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to facilitate the reliable communication of information within and between information handling systems, various uniform rules and protocols have been developed to increase the reliability and the effectiveness of information handling systems. One such protocol is the change to Alert Standard Format (ASF) which has been developed by the Distributed Management Task Force. ASF defines alert messages that are sent from client systems (also know as 'managed nodes') in a network to a designated management console. ASF alerts are generated in response to specific system conditions such as when a client system is overheating or when a chassis intrusion has been detected. In accordance with ASF, the alerts are generated in a particular format known as Platform Event Traps (PET). The PETs are then directed to a managing body such as a management console in order to be appropriately recorded, reported and acted upon.

One problem associated with using ASF alerts is that each managed node must be manually configured with a designated destination address for sending the ASF alerts. The manual configuration of the destination address consumes significant amounts of time and resources. The manual configuration of the ASF alert destination address also limits the flexibility of the system. In the event that the management console is changed or replaced, the PET destination address of each managed node must be manually reconfigured. Also, the destination address for each managed node must be changed in the event that a managed node connects with a new network, otherwise PETs will be sent to an incorrect destination.

SUMMARY

In accordance with teachings of the present disclosure, a system and method are described for automatically configuring a platform event trap destination address for a managed node. The system and method of the present disclosure substantially reduce the problems and drawbacks associated with previous system and methods for configuring PET destination addresses.

In one aspect the present disclosure includes an information handling system that includes a management console and one or more managed nodes. The management console is connected to a network and has a network address. The managed node connects to the network though a Network Interface Card that includes an Alert Sending Device for generating platform event traps (PETs). In this embodiment the management console sends a PET destination address configuration packet to the Managed Node, designating the destination address as the network address of the management console. The managed node then adopts the PET destination address contained in the configuration packet. More particularly, the management console configuration driver may periodically broadcast the configuration packet at a selective time interval.

In another aspect, the present disclosure includes an information handling system having a management console, a configuration server and at least one managed node connected to a network. Each managed node is able to submit a configuration discovery request to the configuration server; the configuration server then generates and distributes a network configuration information packet in response. The network configuration information packet includes the management console network address as the platform event trap destination address. More particularly, the configuration server may be a Dynamic Host Configuration Protocol server.

The present disclosure includes a number of important technical advantages. One important technical advantage is providing a PET destination address configuration packet to a managed node. The PET destination address configuration packet eliminates the need to manually configure the PET destination address on each node managed by the management console. Additionally, providing the PET destination address configuration packet facilitates making changes necessary to the destination address. Also, providing the PET destination address configuration packet allows the managed node to change networks without requiring the manual reconfiguration of the PET destination address of the managed node.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is an illustration of a network including a management console and a plurality of managed nodes in accordance with the present disclosure;

FIG. 2 is an illustration of a network including a management console, a configuration server and multiple managed nodes in accordance with the present disclosure;

FIG. 5 is a flow diagram showing a method of configuring a platform event trap destination address according to the present disclosure.

FIG. 6 is a flow diagram of another method for configuring a platform event trap destination address according to the present disclosure; and FIG. 7 is a flow diagram showing a method for configuring a platform event trap destination address according to the present disclosure.

DETAILED DESCRIPTION

Figure 3:
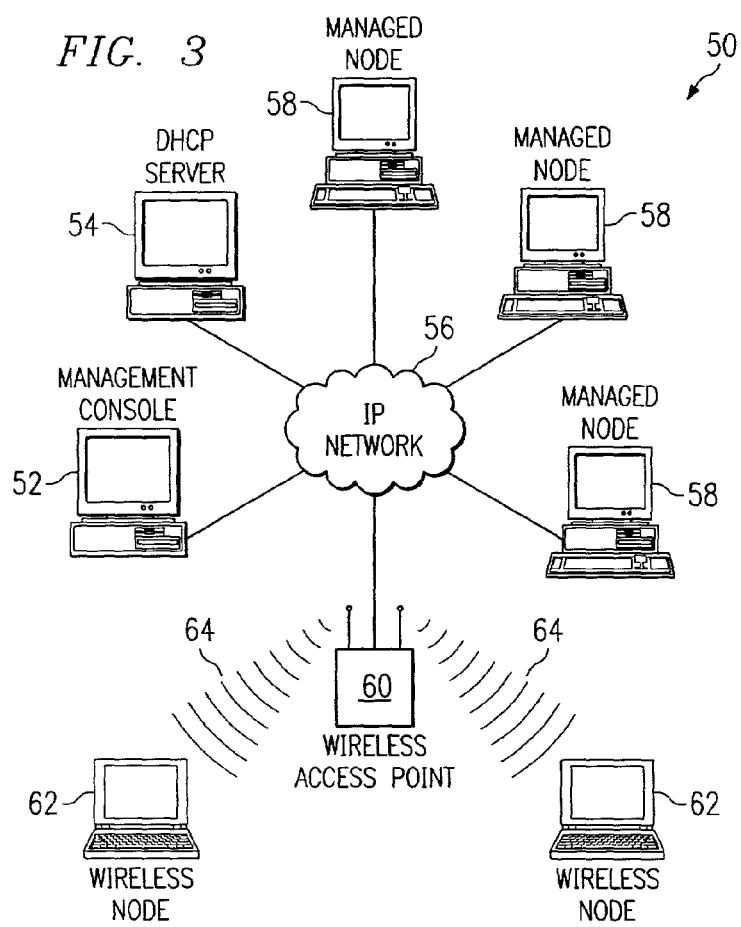
FIG. 3 is a network including wireless access capabilities in accordance with the present disclosure.

Preferred embodiments and their advantages are best understood by reference to FIGS. 1 through 7, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Now referring to FIG. 1, a system depicted generally at 10 according to the present disclosure is disclosed. System 10 includes management console 12 operatively connected with network 14. A plurality of managed nodes 16 are also operatively connected with network 14. In the present embodiment management console 12 is a system on network 14 operable to locate or discover selected types of computers, nodes or other equipment connected to network 14. The elements or equipment discovered by management console 12 may be referred to as clients or managed nodes. Management console 12 is operable to monitor the managed nodes on network 14. For instance, management console 12 may be operable to query managed nodes 16 in order to obtain an update about its status or management console 12 may receive alert or alarm messages sent from managed nodes 16 on network 14.

A plurality of managed nodes 16 are operatively connected with network 14. Individual managed nodes 16 may include computers, workstations or other suitable client devices operable to connect with network 14. As described in FIG. 4 below, managed nodes 16 may also incorporate a network interface card, an alert sending device, and a platform event trap destination address. In the present embodiment, managed node 16 is operable to form or generate an alarm or alert such as an Alert Standard Format (ASF) platform event trap (PET). In particular, managed node 16 may generate an ASF PET in response to a detected condition or event at managed node 16. For example, managed node 16 may detect a chassis intrusion in the event that the exterior housing of the managed node is removed. Additionally, managed node 16 may detect that a cooling fan has malfunctioned, that the managed node has overheated, that a password has been incorrectly submitted a selected number of times, that a BIOS has failed to load, that a BIOS has failed to complete or that no processor or memory has been detected. Generally, managed node 16 may detect any alarm or alert condition as described in the Alert Standard Format specification developed by the Distributed Management Task Force which is incorporated herein by reference. Additional alarm or alert conditions may be generated by a user.

Figure 4:
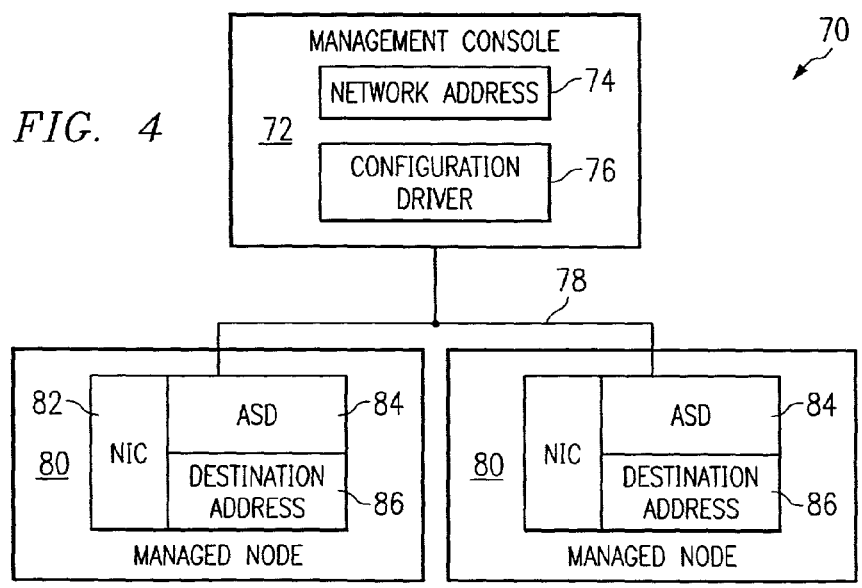
FIG. 4 is a schematic embodiment of a network including a management console with a configuration driver and managed nodes showing a network interface card and an alert sending device.

After generating an ASF PET, managed node 16 preferably sends the PET to a PET destination address. As shown in FIG. 4 below, managed node 16 includes a PET destination address associated therewith. In one embodiment, a PET destination address is stored within the firmware ASF NIC of managed node 16. More particularly, the PET destination address may be stored within electrically erasable programmable read-only memory (EEPROM).

In operation, in the present embodiment management console 12 generates a PET destination address configuration packet 18. In one embodiment, PET destination address configuration packet 18 is an Ethernet packet. At selected intervals, management console 12 broadcasts the PET destination address configuration packet 18 to managed nodes 16 through network 14. Managed nodes 16 receive the PET destination address configuration packet 18 and adopt the PET destination address contained therein. In the present embodiment, management console 12 forms the PET address configuration packet 18 to include the network address of management console 12 as the PET address destination address. After receiving the PET address configuration packet, managed nodes 16 adopt the PET destination address contained therein, which also corresponds with the network address of management console 12. In this manner, managed nodes 16 are automatically configured to send ASF PETs 20 to management console 12, thereby obviating a need to manually configure the PET destination address of each managed node 16.

After adopting the PET destination address contained within the configuration packet 18, managed nodes 16 may periodically generate PETs 20 after detecting a selected condition and send the generated PET to the PET destination address. The arrows shown with configuration packet 18 and PET 20 are included for demonstrative purposes: configuration packet 18 and PET 20 are sent via network 14.

In operation, management console 12 is connected to network 14. Additionally, management console 12 establishes or is provided a network address. Management console 12 periodically generates PET address configuration packets 18 and broadcasts those packets across network 14 to managed nodes 16. Managed nodes 16 receive the PET destination address configuration packet from management console 12 and determines whether or not to adopt the PET destination address contained therein. The steps related to whether or not to adopt the PET destination address of the configuration packet are described in FIG. 5, below. In an alternative embodiment, this step is obviated by adopting the PET destination address of each PET configuration packet 18. Managed node 16 then periodically generates PETs and sends the PETs to the PET destination address.

Now referring to FIG. 2, a system depicted generally at 30 includes a management console, a configuration server and multiple nodes. Management console 32, configuration server 34 and managed nodes 38 are connected to network 36. In the present preferred embodiment, configuration server 34 is a dynamic host configuration protocol (DHCP) server. Dynamic Host Configuration Protocol, or DHCP is a communications protocol that allows network administrators to centrally and automatically manage network information such as internet protocol (IP) addresses within a network. For instance, using IP, each machine within a network requires a unique IP address. When an organization sets up computer users with a connection to the network an IP address must be assigned to each machine. DHCP typically works to automatically assign IP addresses to computers within the network, thereby eliminating the need to have each computer within the network manually assigned an IP address. DHCP operates to allow network administrators to supervise and distribute IP addresses and other network information from a central point and automatically send updated information to computers or machines within the network. In an alternative embodiment, configuration server 34 is a bootstrap protocol server.

In the present embodiment configuration server 34 is operable to form or generate a PET destination address configuration packet. Additionally, managed node 38 is operable to form a DHCP discover message. Managed node 38 submits the DHCP discover message 40 when managed node 38 connects with network 36 and DHCP discover message 40 is sent to configuration server 34. After receiving the DHCP discover message 40, DHCP server 34 then sends the DHCP offer message 42 to the managed node 38. Specifically, the offer message is sent to the particular managed node that had previously submitted DHCP discover message 40. The DHCP offer message 42 may contain a variety of network configuration information including but not limited to a PET destination address. In the present embodiment, DHCP offer 42 includes PET destination address configuration information that designates the network address of management console 32 to be the PET destination address.

Managed node 38 receives DHCP offer 42 from configuration server 34. After receiving DHCP offer 42, managed node 38 adopts the configuration information contained in DHCP offer 42. More particularly, managed node 38 adopts the PET destination address contained within DHCP offer 42. Specifically, managed node 38 adopts as the PET destination address the network address of management console 32. In the event that managed node 38 submits a DHCP discovery packet 40 and does not receive a DHCP offer 42 in response within a selected period of time, managed node 38 may subsequently send a subsequent DHCP discover packet. In the present embodiment, configuration server 34 is manually configured by a system administrator or another suitable user to designate network address of management console 32 to be the PET destination address.

After having configured the PET destination address, managed node may generate platform event traps 20, in accordance with Alert Standard Form and other suitable protocols, and send them to management console 32.

In operation, a managed node 38 connects with network 36 and submits a DHCP discover message 40. The DHCP discover message 40 is preferably received at DHCP server 34. In response, DHCP server 34 will generate and submit a DHCP offer 42 to managed node 38. Managed node 38 preferably then adopts the PET destination address contained within DHCP offer 42 as well as additional configuration information contained therein. Managed node 38 may then periodically generate platform event traps in response to conditions within managed node 38 and submit platforms event traps 20 to management console 32.

Now referring to FIG. 3, a system depicted generally at 50 including a management console and a network with wireless capabilities is depicted. In the present embodiment, management console 52, DHCP server 54 and managed nodes 58 are connected to IP network 56. In an alternative embodiment, DHCP server 54 may be any suitable configuration server. In the present embodiment wireless access point 60 connects with IP network 56 and further allows wireless nodes 62 to wirelessly connect 64 to IP network 56. Similar to the embodiment shown in FIG. 2, in the present embodiment managed nodes 56 and 58 and wireless nodes 62 may send a discovery request when they become connected with IP network 56 which is received by DHCP server 54. DHCP server 54 may then respond by submitting a configuration packet that includes, among other information, a platform event trap destination address that designates the destination address as the network address of management console 52. In an alternative embodiment, similar to the embodiment shown in FIG. 1, the configuration packet may be broadcast periodically from management console 52 and received by managed nodes 58 or wireless nodes 62. After having received the PET destination address configuration packet, managed nodes 58 and wireless nodes 62 may adopt the PET destination address which is also the network address of management console 52. Subsequently, managed nodes 58 PETs in response to conditions detected at managed nodes 58 and wireless nodes 62; the PETs are then preferably sent to management console 52. In the event that wireless node 62 connects with a new network, a discovery request is sent to the configuration server of the new network and the configuration process is repeated for the new network including adopting the network address of the management console of the new network as the PET destination address. This allows wireless managed node 58 to switch between networks without requiring manual configuration of the PET destination address each time wireless managed node 58 changes networks.

Now referring to FIG. 4, a diagram of a management console and managed nodes in accordance with the present disclosure is depicted. In this embodiment management console 72, including network address 74 and configuration driver 76, is connected to network 78. Network address 74 includes a network address for management console 72 compatible with network 78. Configuration driver 76 is preferably operable to generate a configuration packet or configuration message, the configuration packet designating network address 74 as the desired PET destination address. Configuration driver 76 may further broadcast the configuration packet across network 78 to managed nodes 80.

Managed nodes 80 each include a network interface card (NIC) operable to communicate with network 78. NIC 82 includes alert sending device 84 and a destination address field 86. Alert sending device 84 is operable to generate ASF PETs as described in FIG. 1. In a particular embodiment alert sending device 84 runs on firmware operating within NIC 82. Further, ASD 84, after generating an alert according to ASF, may submit the generated PET to destination address 86.

NIC 82 is further operable to receive a configuration packet from configuration driver 76. After receiving the configuration packet from configuration driver 76, NIC 82 may determine the PET destination address contained within the configuration packet and determine whether destination address field 82 should be updated to include the PET destination address contained within the configuration packet sent from configuration driver 76. One embodiment of the determination of whether update destination address field 82 is described in FIG. 5, below.

Now referring to FIG. 5 a flow diagram depicts one embodiment of a method for automatically configuring PET destination addresses. The method begins 110 in the present embodiment by broadcasting a configuration packet from a management console 112. The configuration packet is received at a managed node 114. Next, the existing PET destination address contained on the NIC of the managed node is identified 116, and it is determined whether or not a PET destination address exists 118. In the event that there is no designated PET destination address the method moves directly to step 124 and the PET destination address specified by the configuration packet is adopted. In the event that a PET destination address is in existence the existing PET destination address is compared with the PET destination address contained in the configuration packet 120. If the existing PET destination address is the same as the configuration packet PET destination address then the method ends 126. In the event that the existing PET destination address is not the same as the PET destination address contained in the configuration packet, the PET destination address contained in the configuration packet is adopted 124.

Now referring to FIG. 6, a flow diagram of a method for automatically configuring a PET destination address is depicted generally at 130. The method begins at 132 when a network is accessed by a managed node 134. The managed node then sends a DHCP discover request to a DHCP server through the network 136. The DHCP discover request is then received by the DHCP server within the network 138 and a configuration packet designating a PET destination address is generated by the DHCP server 140. The configuration packet is then sent by the DHCP server 142 and received by the managed node 144. The destination PET address contained within the configuration packet is then adopted by the managed node 146. ASF PETs may then be generated by managed node 148 in response to particular conditions at the managed node. The PETs are then sent to the PET destination address stored within the managed node 150.

Now referring to FIG. 7, a flow diagram of a method according to the present disclosure is depicted. The method depicted generally at 160 begins at 162 and a managed node connects with a wireless access point of a first network 164. A managed node may then submit a discovery request to a configuration server of the first network 166. The configuration server then generates a PET destination address configuration packet 168 and then sends the PET address configuration packet to a wireless managed node 170. After receiving the PET address configuration packet, the wireless managed node preferably adopts the PET address for the first network 172. In the preferred embodiment, the PET destination address is the network address of the management console for that network. The wireless managed node may then generate ASF PETs in response to network conditions and send those PETs to the first network PET destination address 174. Subsequently, the wireless managed node may disconnect from the first network 176.

The wireless managed node may then connect to a wireless access point of a second network 178. The wireless managed node may send a discovery request to the configuration server of the second network 180 and the configuration server of the second network may generate a platform event trap destination address configuration packet 182 and send it to wireless managed node 184. The wireless managed node may then receive the configuration packet and adopt the platform event trap destination address for the second network 186. In a preferred embodiment the platform event trap destination address for the second network is the network address of the management console of the second network. After adopting the platform event trap destination address for the second network the wireless managed node may periodically generate Alert Standard Format platform event traps and send those to the management console of the second network. The dynamic configuration of a new PET destination address allows the managed node to change networks and maintain event notification, without requiring manual configuration of PET destination addresses.

Although the disclosed embodiments have been described in detail, it should be understood that various changes, substitutions and alterations can be made to the embodiments without departing from their spirit and scope.

What is claimed is:

1. An information handling system comprising:
   a plurality of managed nodes operatively connected to a network, a particular one of the managed nodes having a network interface card (NIC);
   the NIC having an alert sending device (ASD), the ASD operable to generate platform event traps (PETs) for transmission to a management console having a management console address;
   the NIC further having an associated PET destination address for routing PETs from the particular managed node;
   the particular managed node operable to receive a PET destination address configuration packet broadcast to the plurality of managed nodes, the PET destination address configuration packet designating the management console address as PET destination address; and
   the particular managed node operable to adopt the PET destination address contained in the PET destination address configuration packet such that PETs can be routed from the particular managed node to the management console.

2. The information handling system of claim 1 further comprising the management information console having a configuration driver operable to generate the PET destination address configuration packet.

3. The information handling system of claim 2 comprising the management console configuration driver periodically broadcasting the configuration packet at a selected time interval.

4. The information handling system of claim 1 wherein the network comprises an IP network.

5. The information handling system of claim 1 further comprising the particular managed node operable to:
   compare an existing PET address associated with the particular managed node NIC with the received PET address; and
   adopt the received PET destination address if the received PET destination address differs from the existing PET destination address.

6. The information handling system of claim 1 further comprising the ASD operable to generate a PET in response to a managed node event.

7. The information handling system of claim 6 further comprising the PET generated in compliance with Alert Standard Format.

8. The information handling system of claim 1 further comprising the network having a wireless access point and the particular managed node operable to wirelessly communicate with the network via the wireless access point.

9. The information handling system of claim 1 further comprising a configuration server connected to the network and operable to generate the PET destination address configuration packet.

10. The information handling system of claim 9 wherein the configuration server comprises a dynamic host configuration protocol server.

11. The information handling system of claim 9 further comprising:
the particular managed node operable to generate and submit a configuration discovery request; and
the configuration server operable to receive the configuration discovery request and communicate the PET destination address configuration packet to the particular managed node.

12. A platform event trap (PET) destination address configuration system comprising:
a destination address configuration driver for generating a configuration information packet including a PET destination address, the PET destination address comprising a network address for management console communicatively coupled to a plurality of managed nodes via a network;
wherein the destination address configuration driver is operable to broadcast the configuration packet over the network to the plurality of managed nodes such that a particular one of the managed nodes may adopt the PET destination address in the configuration information packet for routing platform event traps associated with the particular managed node to the management console.

13. The configuration system of claim 12 further comprising the configuration driver operable to periodically broadcast the configuration information packet over the network.

14. A method for configuring a platform event trap (PET) destination address comprising:
connecting a plurality of managed nodes to a network having a management console, the management console having a network address;
broadcasting a PET destination address configuration packet to the plurality of managed nodes through a network, the configuration packet designating the management console network address as the PET destination address;
receiving the configuration packet at a particular one of the managed nodes; and
adopting the management console network address as the PET destination address of the particular managed node such that PET can be routed from the particular managed node to the management console.

15. The method of claim 14 further comprising sending the configuration packet to the particular managed node via a wireless network.

16. The method of claim 14 further comprising:
generating an alert standards forum platform event trap in the particular managed node in response to a managed node condition and transmitting the platform event trap to the network address of the management console.

17. The method of claim 14 further comprising:
sending a configuration discovery request from the particular managed node after connecting to the network;
receiving the configuration discovery request at a Dynamic Host Configuration Protocol server; and
sending the configuration packet from the Dynamic Host Configuration Protocol server.

18. The method of claim 14 further comprising periodically broadcasting the configuration packet from the management console at a selected interval.

* * * * *